Patented Dec. 17, 1929

1,740,342

UNITED STATES PATENT OFFICE

CHRISTIAN HANSEN, OF WIESDORF-ON-THE-RHINE, GERMANY, ASSIGNOR TO I. G. FARBENINDUSTRIE AKTIENGESELLSCHAFT, OF FRANKFORT-ON-THE-MAIN, GERMANY

RECOVERY OF SULPHUROUS ACID FROM WASTE GASES

No Drawing. Application filed May 6, 1927, Serial No. 189,448, and in Germany October 8, 1925.

The recovery of the sulphur dioxide present in low concentrations in certain types of waste gas from various industrial operations has been accomplished heretofore only to a limited extent, for instance, in the form of sodium bisulfite.

This invention provides an economical method for the recovery of sulphurous acid in a very pure and concentrated form from waste gases even if these gases contain only a very low concentration of sulphur dioxide.

The process consists essentially in the absorption of the sulphur dioxide content of the waste gases by passing them through a solution containing ammonium bisulfite and ammonium sulfite, in either one or several successive stages, and then treating the resulting solution which consists principally of ammonium bisulfite with a strong acid, i. e., an acid which reacts therewith to form an ammonium salt and concentrated sulphurous acid, the ammonium salts produced being usually ammonium chloride and ammonium sulfate.

Since synthetic ammonia and that obtained in the manufacture of coal gas must be eventually converted into salts by means of sulphuric acid or in some other way, the sulphur dioxide is recovered from the waste gases by this process in a highly valuable form without any extra expenditure of material or without any substantial increase in cost. According to this process one molecule of sulphuric acid produces two of sulphurous acid, and from the latter two molecules of sulphuric acid may be produced i. e., double the quantity needed in the process.

In order to carry out the process to the best advantage it is necessary to control it so that:

(1) No loss of ammonia occurs;
(2) The sulphur dioxide content of the waste gases is absorbed as completely as possible, and the solution thus obtained should contain the maximum quantity of sulphur dioxide corresponding to a given quantity of ammonia;
(3) The ammonium salts produced should be in as concentrated solution as possible or in the solid form.

Ammonium sulfite $((NH_4)_2SO_3)$ solutions exhibit particularly at high concentrations a substantial partial pressure of ammonia, while ammonium bisulfite $(NH_4HSO_3)$ solutions exhibit a partial pressure of sulphurous acid; consequently the use of ammonium sulfite solution as an absorbing medium for sulphur dioxide results in losses of ammonia, while the use of ammonium bisulfite results in an ineffective absorption. For this reason, a solution containing both ammonium sulfite and ammonium bisulfite is used as an absorbing medium, and the composition of this solution is maintained substantially unchanged throughout the course of the absorption by adding ammonia in the amounts corresponding to the sulphur dioxide absorbed and withdrawn as ammonium bisulfite. The ammonium sulfite and ammonium bisulfite content of the absorbing solution should be proportioned so as to result in a maximum absorption of sulphur dioxide with as little loss as possible due to the escape of ammonia. No fixed value for the proportion of ammonium bisulfite to ammonium sulfite may be set since it will vary according to the particular circumstances under which the process is applied, i. e., the concentration of sulphur dioxide in the waste gases, the particular absorbing apparatus used, the strength of the absorbing solution, the temperature, etc. This ratio may, however, be easily determined in practice by an analysis of the gases coming from the absorber and then varying the composition and strength of the absorbing agent in accordance with such findings. For instance, if these gases show an unduly large percentage of unabsorbed sulphur dioxide this may be corrected by increasing the proportion of ammonium sulfite in the absorbing liquid. Likewise, if there is an unduly large amount of ammonia present in these gases, this may be corrected by reducing the partial pressure of the absorbing solution with respect to ammonia by increasing the proportion of ammonium bisulfite present therein.

In carrying out the process, it has been found advantageous to use several absorbers, the first of these being charged so that the liquid discharged therefrom is a substantially pure and highly concentrated ammonium bisulfite solution, while the last absorber is charged with a weak solution of ammonium bisulfite together with relatively large quantities of ammonium sulfite, and which, consequently, is capable of effectively absorbing the sulphur dioxide content of the waste gases even when present therein in very low concentrations. During the absorption operation, ammonia is added to this last absorber, preferably continuously and in the form of an aqueous solution, in quantities corresponding to the sulphur dioxide absorbed. The liquid discharged from this last absorber consists of a solution of both ammonium bisulfite and ammonium sulfite, and a part of this liquid,—the amount equivalent to the ammonium sulfite and ammonium bisulfite produced by the absorption of sulphur dioxide and the addition of ammonia,—passes into the preceding absorber, i. e., the first absorber if only two are used, while the remainder of the liquid discharged from the last absorber is returned thereto.

For the absorption apparatus it is advisable to use, provided no separation of solid salts occurs during the absorption operation, the conventional type of gas scrubbing towers through which the gas and absorbing medium are passed in counter-current flow, and which are filled with some form of packing having a large number of interstices designed to effect intimate contact of the gas and liquid.

The process is controlled so that a highly concentrated ammonium bisulfite solution is discharge from the first absorber, i. e., the first absorber in the path of the gases containing $SO_2$ and is then withdrawn either wholly or partially from the absorption operation and converted into ammonium salts by the procedure described hereinafter. It is advisable, however, to return a part, preferably more than 50%, of this discharged ammonium bisufite back into the first absorber after first treating it with ammonia, either gaseous or in aqueous solution, so as to convert a portion of it to ammonium sulfite together with the ammonium bisulfite and ammonium sulfite solution obtained from the succeeding towers. Likewise, if more than two absorbers are used these absorbers are so charged and arranged with respect to the stream of $SO_2$-containing gas that the latter will be contacted with an absorbing solution of progressively increasing ammonium sulfite and progressively decreasing ammonium bisulfite concentration. Each of the individual absorbtion towers is supplied with quantities of ammonia, either as such or as a sulfite, corresponding to the sulphur dioxide to be absorbed so that the ratio of ammonium bisulfite to ammonium sulfite therein remains practically constant. It is preferable to effect the withdrawal and transfer of the absorbing solution and the additions of ammonia in a continuous manner by means of overflow pipes or similar automatic means although this is not essential.

The production of ammonium salts and concentrated sulphurous acid from the solution obtained from the absorbing operation which consists for the most part of ammonium bisulfite together with some ammonium sulfite depending upon individual operating conditions may be effected in various ways. The acid may be introduced into the bisulfite solution or the bisulfite solution into the acid, or both solutions may be continuously mixed by flowing a stream of each into a suitable agitating vessel which preferably contains a small amount of salt solution left over from previous operations so that a uniform production of sulphurous acid is obtained. The method wherein the acid and bisulfite liquor are introduced into the mixing vessel in continuous streams, the volumes of which are regulated by a suitable device such as a rotameter so as to maintain the proper proportions, is an especially advantageous procedure.

In order to produce a further evolution of sulphur dioxide from the solution, it is passed over bodies of a large surface area, whereby an extensive discharge of gas from the solution is effected. To completely recover the dissolved sulphur dioxide, it is necessary to heat the solution preferably by a step separate from the subsequent evaporation. This may be accomplished by passing the solution through the column of a still in which the body of the solution is kept just at the boiling point. The contacting of the vapors emitted from the boiling solution with the incoming solution heats it sufficiently to expel practically all the sulphur dioxide, and only the last traces are expelled in the still proper. The column is fed continuously and a corresponding amount of liquor is withdrawn from the still by an overflow pipe. The solution withdrawn from the still is either evaporated immediately before cooling occurs, or its heat content is recovered by using it in a suitable counter-current heat-exchanger to preheat the solution introduced at the top of the column. This method effects substantial economies in the amount of heat or steam necessary to recover the dissolved sulphur dioxide.

It is possible by a slight modification of the absorbing operation to obtain the ammonium salts in a solid or concentrated form thereby wholly or partially dispensing with the necessity of evaporation. This modification consists in using concentrated solutions of the ammonium salt as the absorbent for the sulphur dioxide from the waste gases, such solutions for instance as are obtained by previous treatments of ammonium bisulfite liquor with an acid. The absorbing operation is carried out substantially as described above, suitable additions of ammonia being made corresponding to the sulphur dioxide absorbed; however, this ammonia should be in the gaseous form in order to avoid dilution. As the sulphur dioxide containing waste gases are passed through this solution ammonium bisulfite is produced as before, which results in a partial precipitation of the dissolved ammonium salts as solid salts. A slurry comprising a mixture of these solid salts and the absorption solution is withdrawn either continuously or periodically from the absorber, and is then mixed in a suitable vessel equipped with a stirrer with a quantity of acid coresponding to its ammonium bisulfite content, thereby effecting a further separation of ammonium salts and the formation of a mother liquor which is saturated with sulphurous acid. Most of this sulphurous acid may be expelled by heating. Instead of expelling the free sulphurous acid it may be neutralized by addition of ammonia, the liquor being separated subsequently from the precipitate by means of agitating or centrifuging. The mother liquor finally returns to the adsorption operation in this case. Upon drying the solid ammonium salt further small quantities of sulphur dioxide are obtained which may be reintroduced into the absorber. This modification of the absorption operation may also be practiced with advantage in several absorbers, the process being controlled so that the precipitation of the ammonium salts takes place principally or entirely in the first absorber.

When passing, for instance, a sulphur-dioxide containing gas through a solution containing ammonium sulfite, ammonium bisulfite, and ammonium sulfate, the sulphur dioxide content of the gas is absorbed and ammonium bisulfite is produced which results in a partial precipitation of the dissolved ammonium sulfate.

The sulphurous acid obtained by the above described processes may be either utilized as such or converted into sulphuric acid. Because of its high purity it is particularly well adapted for conversion into sulphuric acid by the contact process.

The above process may be applied also to gases having a higher concentration of sulphurous acid than that usually present in waste gases, such as the gases obtained from various ore roasting processes termed "roast" gases.

For instance, when the supply of waste gases is insufficient to supply the concentrated sulphurous acid needed for a certain purpose, this deficiency may be made up by introducing a suitable amount of the gases derived from ore roasting processes into the waste gases.

In case several absorbers are used preferably only the "roast" gas is introduced into the first of these so that the liquor discharged therefrom will be in the form of ammonium bisulfite. The dilute waste gas together with the residue of the "roast" gas leaving the first absorber is introduced into the subsequent absorbers.

I claim:

1. A process for the recovery of sulphur dioxide from $SO_2$-containing gas, which comprises passing said gas through an absorber counter-currentwise to a solution containing ammonium sulfite and ammonium bisulfite in such proportions and concentrations as to have substantially no partial pressure with respect to either ammonia or sulphur dioxide, separating from the liquor containing the absorbed sulphur dioxide discharged from the absorber a portion corresponding to the sulphur dioxide absorbed therein, and recirculating the remainder of the liquor through the absorber, and maintaining said proportions and concentrations of ammonium sulfite and ammonium bisulfite by adding quantities of ammonia corresponding to the sulphur dioxide absorbed.

2. A process for the recovery of sulphur dioxide from $SO_2$-containing gases, which comprises contacting a stream of said gas with solutions containing ammonium sulfite and ammonium bisulfite in several successive stages, the gas being contacted in each stage with a solution of a lower ammonium bisulfite content than that used in the stage immediately preceding it with respect to the flow of said gas.

3. A process for the recovery of sulphur dioxide from $SO_2$-containing gases, which comprises passing a stream of said gas in counter-current flow with solutions containing ammonium sulfite and ammonium bisulfite in several successive stages, the gas being contacted in each stage with a solution of a lower ammonium bisulfite content than that used in the stage immediately preceding it with respect to the flow of said gas.

4. A process for the recovery of sulphur dioxide from $SO_2$-containing gases, which comprises contacting a stream of said gas with solutions containing ammonium sulfite and ammonium bisulfite in several successive stages, the proportions and concentrations of ammonium sulfite and ammonium bisulfite in the absorbing solution in the last stage with respect to the passage of the $SO_2$-containing gas being such as to render the same substantially free of partial pressures with respect to sulphur dioxide and ammonia.

5. A process for the recovery of sulphur dioxide from $SO_2$-containing gases, which comprises passing a gas containing a relatively high sulphur dioxide content through an absorber counter-currentwise to a solution of ammonium sulfite and ammonium bisulfite so that the liquid discharged therefrom consists principally of ammonium bisulfite, and then passing the residual gas containing the unabsorbed sulphur dioxide, together with a gas containing a relatively low concentration of sulphur dioxide, through one or more succeeding absorbers containing a solution of ammonium sulfite and ammonium bisulfite, the ammonium bisulfite content of the absorbing liquid used in each absorber being less than that in the absorber immediately preceding it with respect to the flow of gas.

6. A process for the production of sulphur dioxide and ammonium salts of strong acids, which comprises contacting an $SO_2$-containing gas with a solution containing ammonium sulfite, ammonium bisulfite, and an ammonium salt of a strong acid, thereby absorbing the sulphur dioxide content of the gas and precipitating the ammonium salt of a strong acid.

7. A process for the production of sulphur dioxide and ammonium salts of strong acids, which comprises contacting an $SO_2$-containing gas with a solution containing ammonium sulfite, ammonium bisulfite and ammonium sulfate, thereby absorbing the sulphur dioxide content of the gas and precipitating ammonium sulfate.

In testimony whereof I affix my signature.

CHRISTIAN HANSEN.